(12) United States Patent
Prud'Homme

(10) Patent No.: US 9,683,187 B2
(45) Date of Patent: Jun. 20, 2017

(54) METHOD AND APPARATUS FOR TORREFACTION OF BIOMASS WITH A CYCLONIC BED REACTOR

(71) Applicant: AIREX ENERGIE INC., Laval (CA)

(72) Inventor: Guy Prud'Homme, Mont-Royal (CA)

(73) Assignee: AIREX ENERGIE INC., Laval, Quebec (CA)

( * ) Notice: Subject to any disclaimer, the term of this patent is extended or adjusted under 35 U.S.C. 154(b) by 34 days.

(21) Appl. No.: 14/403,795

(22) PCT Filed: May 27, 2013

(86) PCT No.: PCT/CA2013/050402
§ 371 (c)(1),
(2) Date: Nov. 25, 2014

(87) PCT Pub. No.: WO2013/173929
PCT Pub. Date: Nov. 28, 2013

(65) Prior Publication Data
US 2015/0143742 A1  May 28, 2015

Related U.S. Application Data

(60) Provisional application No. 61/651,862, filed on May 25, 2012.

(51) Int. Cl.
*C10L 5/00* (2006.01)
*C10L 5/44* (2006.01)
(Continued)

(52) U.S. Cl.
CPC .................. *C10L 5/442* (2013.01); *C10L 5/40* (2013.01); *C10L 5/445* (2013.01); *C10L 9/083* (2013.01); *C10L 2290/02* (2013.01); *C10L 2290/06* (2013.01); *C10L 2290/08* (2013.01); *C10L 2290/50* (2013.01); *C10L 2290/58* (2013.01);
(Continued)

(58) Field of Classification Search
CPC .......... C10L 5/442; C10L 9/083; C10L 5/445; C10L 2290/08; C10L 2290/58; C10L 2290/50; C10L 5/40; C10L 2290/06
See application file for complete search history.

(56) References Cited

U.S. PATENT DOCUMENTS 8,203,024 B2 * 6/2012 Leonhardt ............... C10B 49/02
201/16
8,246,788 B2 * 8/2012 Teal .......................... C10B 1/10
202/100
(Continued)

FOREIGN PATENT DOCUMENTS

DE  102009052902 A1  10/2010
EP     2385096 A2     11/2011
(Continued)

*Primary Examiner* — Cephia D Toomer
(74) *Attorney, Agent, or Firm* — Norton Rose Fulbright Canada LLP

(57) ABSTRACT

A method for the torrefaction of biomass comprises receiving biomass having a given moisture content. The biomass is heated in a generally inert environment by indirect contact. The biomass is subsequently torrefied by exposing the biomass to a flow of combustion gases in the generally inert environment. The biomass is outlet with a reduced moisture content.

20 Claims, 3 Drawing Sheets

(51) Int. Cl.
 *C10L 9/08* (2006.01)
 *C10L 5/40* (2006.01)
(52) U.S. Cl.
 CPC ............... *Y02E 50/10* (2013.01); *Y02E 50/15* (2013.01); *Y02E 50/30* (2013.01)

(56) References Cited

U.S. PATENT DOCUMENTS

| | | | | |
|---|---|---|---|---|
| 2011/0041392 A1* | 2/2011 | Stromberg | ............. | C10L 5/363 44/607 |
| 2012/0017499 A1 | 1/2012 | Leonhardt | | |
| 2012/0042567 A1 | 2/2012 | Rawls et al. | | |
| 2012/0137538 A1* | 6/2012 | Lampe | ...................... | C10B 7/02 34/487 |

FOREIGN PATENT DOCUMENTS

| | | | |
|---|---|---|---|
| GB | 2479924 A | | 11/2011 |
| WO | 2005056723 A1 | | 6/2005 |
| WO | WO2011135305 | * | 11/2011 |

* cited by examiner

METHOD AND APPARATUS FOR TORREFACTION OF BIOMASS WITH A CYCLONIC BED REACTOR

FIELD OF THE APPLICATION

The present application relates to the transformation of biomass into products of increased energy density (e.g., combustion products) and increased carbon content, and more particularly to a method and apparatus therefor.

BACKGROUND OF THE ART

In the torrefaction of biomass, products of increased energy density and increased carbon content are produced by the thermal treatment of the biomass. Torrefaction may decompose reactive content from the biomass (e.g., hemicellulose content), remove organic volatile compounds and/or moisture from the biomass. Hence, the products resulting from torrefaction have an increased energy density and carbon content that is well suited for various applications, such as efficient combustion. However, the thermo-transformation of biomass into fuel may be problematic, for instance due to the flammable nature of the end product.

SUMMARY OF THE APPLICATION

It is therefore an aim of the present disclosure to provide a method and apparatus that addresses issues associated with the prior art.

Therefore, in accordance with the present application, there is provided a method for the torrefaction of biomass comprising: receiving biomass having a given moisture content; heating the biomass in a generally inert environment by indirect contact; subsequently torrefying the biomass by exposing the biomass to a flow of combustion gases in the generally inert environment; and outletting the biomass with a reduced moisture content.

Further in accordance with the present disclosure, heating the biomass by indirect contact comprises circulating the biomass in a conduit surrounded by a heated sleeve.

Still further in accordance with the present disclosure, wherein heating the biomass comprises directing the combustion gases in the heated sleeve.

Still further in accordance with the present disclosure, circulating the biomass in the conduit comprises conveying the biomass with a feed screw.

Still further in accordance with the present disclosure, heating the biomass in a generally inert environment comprises inletting the biomass in the conduit by operating a rotary valve.

Still further in accordance with the present disclosure, heating the biomass comprises heating the biomass to a temperature ranging from to 250 C to 400 C.

Still further in accordance with the present disclosure, exposing the biomass to a flow of combustion gases comprises circulating the biomass in a cyclonic flow.

Still further in accordance with the present disclosure, circulating the biomass in a cyclonic flow comprises exposing the biomass to an annular vortex of the combustion gases in the cyclonic flow to increase a resident time of the biomass in the cyclonic flow.

Still further in accordance with the present disclosure, torrefying the biomass comprises exposing the biomass to a temperature ranging from 300 C to 500 C by exposing the biomass to the combustion gases.

Still further in accordance with the present disclosure, the biomass is cooled after the outletting by conveying the biomass in a feedscrew unit.

Still further in accordance with the present disclosure, outletting the biomass comprises operating a rotary valve to control an amount of outlet biomass.

Still further in accordance with the present disclosure, the biomass is dried prior to heating the biomass by indirect contact.

Still further in accordance with the present disclosure, drying the biomass comprises at least one of mixing and recirculating biomass within a chamber of a reactor while exposing the biomass to hot air.

Still further in accordance with the present disclosure, drying the biomass comprises drying the biomass to a moisture content ranging from 20% to 40%.

Still further in accordance with the present disclosure, drying the biomass comprises heating air by heat exchange with combustion gases used for at least one of heating the biomass by indirect contact and torrefying the biomass.

Still further in accordance with the present disclosure, a temperature of the combustion gases is controlled used for of heating the biomass by indirect contact and torrefying the biomass, by operating a heat exchanger with refrigerant in a pneumatic circuit in which the combustion gases circulate.

Still further in accordance with the present disclosure, a condensate from the heat exchanger is collected to remove moisture from the combustion gases.

Still further in accordance with the present disclosure, operating the heat exchanger comprises operating the heat exchanger adjacent to an outlet of the torrefying of the biomass.

Still further in accordance with the present disclosure, torrefaction gases are collected from the step of exposing the biomass to a flow of combustion gases, whereby exposing the biomass to a flow of combustion gases comprises exposing the biomass to a flow of combustion gases and of torrection gases

DESCRIPTION OF THE PREFERRED EMBODIMENTS

Figure 1:
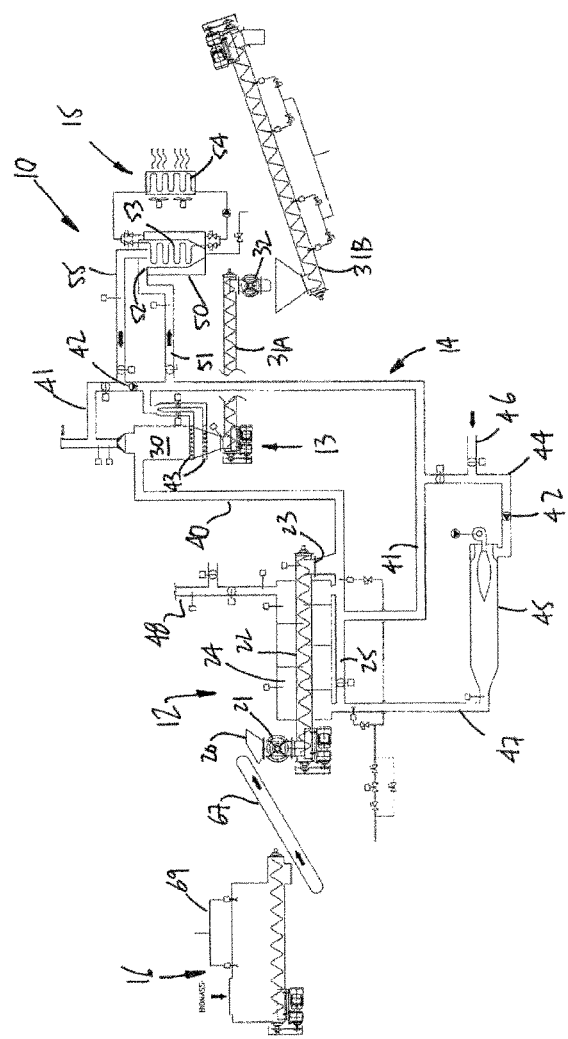
FIG. 1 is a schematic diagram of a thermo-transformation system in accordance with the present disclosure.

Referring to FIG. 1, there is illustrated a thermo-transformation system 10. The thermo-transformation system 10 is used to perform the thermo-transformation (i.e., torrefaction) of biomass. The biomass feedstock may be in any appropriate format, such as sawdust, pellets, flakes, chips, etc. The biomass may have been screened and passed through a sieve to be within a given range of granulometry. The moisture content of the biomass may be between 20% and 60%, with a range of optimal operation being between 25-40%. For instance, the biomass may originate from wood, agricultural residues, recycled wood, compost, etc. The biomass feedstock may be predried if necessary to reach an appropriate moisture content for being subjected to torrefaction in the thermo-transformation system 10. A pre-drying stage is shown as an example hereinafter.

Figure 2:
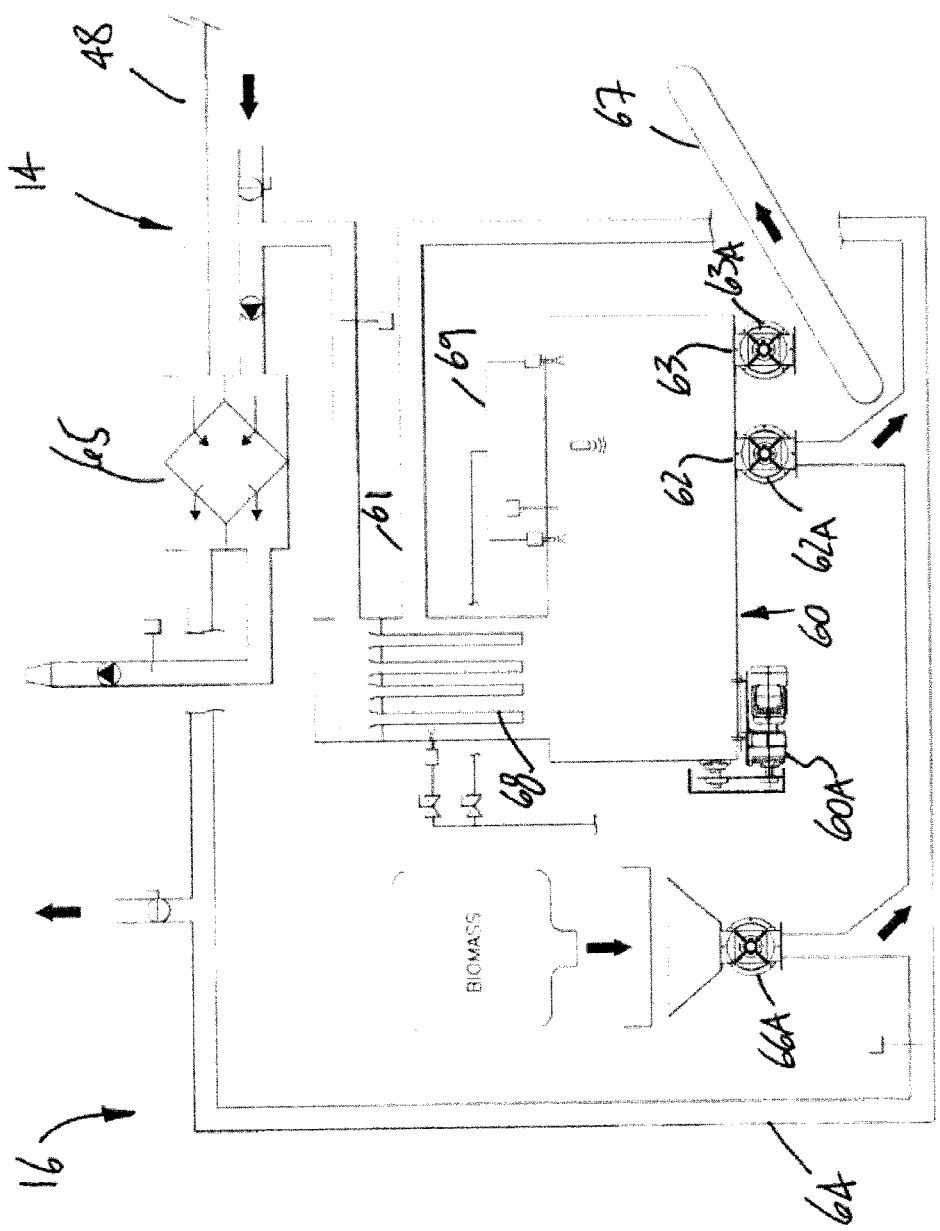
FIG. 2 is a schematic diagram of a pre-drying stage of the thermo-transformation system of FIG. 1.

The thermo-transformation system 10 comprises a conditioning stage 12 and a torrefaction stage 13. The stages are interrelated by a pneumatic circuit 14. A condensing unit 15 may be used with the pneumatic circuit 14 to remove condensate from synthesis gases in the pneumatic circuit 14, and regulate a temperature thereof. As shown in FIG. 2, a pre-drying stage 16 may be located upstream of the conditioning stage 12 to pre-dry biomass feedstock prior to feeding same to the conditioning stage 12. The conditioning stage 12 is the biomass inlet of the system 10 and increases the temperature of the biomass feedstock. The torrefaction stage 13 is the biomass outlet of the system 10 and thermally transforms the biomass. The pneumatic circuit 14 displaces the biomass between the conditioning stage 12 and the torrefaction stage 13 (e.g., at a range of 2000-4000 ft/min). Moreover, the pneumatic circuit 14 provides heat in the form of combustion gases to drive the torrefaction stage 13.

The conditioning stage 12 comprises an inlet 20. In the illustrated embodiment, the inlet 20 is a funnel that may be used with a hopper, a conveyor, bulk bags, or any other appropriate apparatus or format in which the biomass will be fed to the system 10. However, in the illustrated embodiment, the biomass is in the form of sawdust. A rotary valve 21 is at a bottom of the inlet 20 and interfaces the inlet 20 to a feed screw unit 22. Therefore, the rotary valve 21 controls the feed rate of the biomass feedstock to the feed screw unit 22.

The feed screw unit 22 may comprise any appropriate feed screw, namely an endless screw within a cylindrical conduit, in addition to an actuator. The actuation of the endless screw (i.e., rotation) will result in the movement of the biomass along the cylinder to an outlet 23 at an opposed end of the feed screw unit 22. The feed screw unit 22 may comprise a double or twin feed screw to increase the throughput of biomass in the conditioning stage 12 (e.g., 10-25 Hz).

The feed screw unit 22 may further have a sleeve 24 to heat the mass moving in the cylindrical conduit. An inlet of the sleeve 24 is at an upstream end of the feed screw unit 22, whereby the flow of combustion gases (a.k.a., flue gas) in the sleeve 24 is in the same direction as that of the biomass. As shown in FIG. 1, a screw-like path may be defined by the insertion of baffle walls within the sleeve 24 (for instance forming a spiral path), increasing the time of residency of the hot air in the sleeve 24. A water injection unit may also be provided at the inlet 20 or outlet 23, within the rotary valve 21 (e.g., an annular nozzle). The water injection unit may be used to lower the temperature of the biomass, for instance if the temperature within the outlet screw unit 22 is above a predetermined threshold (a suitable range of temperatures being from 250 C to 400 C). Other methods are also considered to lower the temperature in the feed screw unit 22, such as having a part of the combustion gases bypass the sleeve 24, via bypass 25.

Accordingly, by the presence of the sealed rotary valve 21 and by the use of the feed screw unit 22 with heated sleeve 24, the biomass circulating in the feed screw unit 22 will be exposed to high temperatures in an inert environment (i.e., low oxygen). The sealed rotary valve 21 may limit the infiltration of oxygen into the system 10. For instance, the biomass is exposed to a temperature higher than a temperature of condensation of tar.

Therefore, at the outlet 23, the temperature of the biomass has raised. The outlet 23 may be positioned on an underside of the cylinder of the feed screw unit 22. A continuous feed of conditioned biomass is as a result dropped out of the feed screw unit 22, and will be transported to the torrefaction stage 13 by the pneumatic conveyor 14, as described in further detail hereinafter.

According to an embodiment, the torrefaction stage 13 comprises one or more cyclonic bed reactors 30 (a.k.a., torrefaction reactor 30), with of the cyclonic bed reactors being illustrated in FIG. 1. The torrefaction stage 13 may comprise one or more of the torrefaction reactors 30, or any other torrefaction apparatus. In the torrefaction stage 13, the biomass is exposed to combustion gases, during at least a minimum time of residency. The combustion gases are at any appropriate temperature to have a torrefying effect on the biomass. As an example, the combustion gases are at a temperature ranging between 300 and 500° C., although temperatures outside this range may be appropriate as well in certain circumstances. As a result of the exposure to the combustion gases, the biomass is torrefied: the level of moisture is substantially reduced, and volatile organic compounds are removed. The volatile organic compounds form the torrefaction gases composed of condensable and non-condensable gases. The cyclonic bed reactors 30 may be similar in configuration to the filtration apparatus described in US patent application publication No. 2011/0239861, incorporated herewith by reference.

More specifically, the torrefaction reactor 30 may be broadly described as having a casing defining an inner cavity with an upper cylindrical portion, and a lower hopper portion connected to the upper cylindrical portion. The inlet is in the upper cylindrical portion for feeding a flow of gas and the biomass into the inner cavity. The inlet is positioned with respect to the casing to cause movement of the biomass in a downward spiral path in the casing. A solids outlet is at a bottom of the lower hopper portion for outletting the biomass from the casing. A gas outlet is in the upper cylindrical portion to exhaust gases from the casing. There is an annular arrangement of ports (i.e., a pair of sustentation rings, although one or more are possible) in a wall of the lower hopper portion or the cylindrical portion of the casing to inject gas into the inner cavity (i.e., torrefaction gases, combustion gases). The ports are oriented so as to guide these other gas into following a path at least partially vertical when entering the inner cavity to disrupt the movement of the solids in the downward spiral path. Hence, the gases injected through the ports of the sustentation ring may increase the residency time of the biomass in the reactor 30. For instance, the ports have a vertical component in their orientation, to guide the gases upwardly, and in the spiral path.

US patent application publication No. 2011/0239861 describes a filtration configuration at an upper end of the support wall of the filtration apparatus. The cyclonic bed reactor 30 may have a different filtration configuration, or even limited or no filtration.

A feed screw unit 31A may be located at the bottom of the reactors 30 to collect the dry thermo-transformed biomass exiting from the torrefaction reactors 30, and to cool off the biomass. A second screw unit 31B may be used to cool off the biomass. A water injection unit may also be provided adjacent to an upstream end of the second screw unit 31B. The water injection unit may be used to lower the temperature of the biomass, for instance if the temperature within the second screw unit 31B is above a predetermined threshold. In an embodiment, a cooling fluid (e.g., water, air) is in heat exchange with the outer surface of the unit 31, for the direct or indirect contact cooling of the biomass. A rotary valve 32 may be positioned at the outlet of the feed screw unit 31, thereby minimizing gas leaks at the outlet of the torrefaction reactors 30, and controlling the torrefied biomass output rate. The system 10 may be provided with multiple feed screw units 31, for instance with one for each of the torrefaction reactors 30.

The use of rotary valves 21 and 32 at the inlet and the outlet of the system 10 reduces and/or prevents oxygen infiltration in the system 10, thereby helping in preserving an inert environment to avoid combustion of the biomass during torrefaction. The feed screw units 31A and 31B, or like mechanism, are used to reduce the temperature of the biomass, to reduce the risk of combustion of the biomass when exposed to oxygen at the outlet of the system 10.

As an alternative to the torrefaction reactors 30, any other configuration of reactor may be used in the torrefaction stage 13 to expose the biomass to combustion gases. For instance, a rotary drum reactor may be operated, or air conveyors may be used provided they have sufficient length to respect the residency time of the biomass, and thus allow sufficient exposure of the biomass to combustion gases. However, the torrefaction reactors 30 are well-suited for being used with a continuous feed of biomass from the conditioning stage 12.

The pneumatic circuit 14 comprises an air conveyor 40 extending from the outlet of the feed screw unit 22 to the inlet of the cyclonic bed reactors 30. Accordingly, the biomass flows to the reactors 30 as entrained by a flow of combustion gases (a.k.a. flue gases), and torrefaction gases emanating from the torrefaction of the biomass. More specifically, the pneumatic circuit 14 has return pipes 41 collecting gases exhausted by the torrefaction reactors 30, whereby the synthesis gases (i.e., syngas) circulating in the pneumatic circuit 14 are a mixture of combustion gases and torrefaction gases. The gases collected at the exhaust are generally hot, with some humidity and generally without airborne dust, as the reactors 30 typically perform some form of filtration. A fan 42 in the return pipes 41 ensures that the flow of gases is of sufficient magnitude in the circuit 14 to cause the movement of the biomass. The fan 42 may be one of numerous fans in the circuit 14. A reactor branch 43 diverges from the return pipes 41 and feeds some gases to the reactors 30 and more specifically to the sustentation ring of the reactors 30. The return pipes 41 converge to a single return pipe also labeled 41, which return pipe connects to the inlet of the air conveyor 40.

A burner branch 44 diverges from the return pipe 41 and is connected to a burner 45. Hence, the burner branch 44 feeds combustion gases and/or torrefaction gases to the burner 45. According to an embodiment, the burner 45 is a combustion burner. Gases exhausted by the torrefaction reactors 30 (i.e, combustion gases and/or torrefaction gases or synthesis gases (syngas)) may be fed into the combustion chamber of the burner 45 through an annular vortex to raise the resident time and combustion efficiency. A fresh air intake 46 is also associated to the burner 45, for instance to adjust the amount of oxygen fed to the burner 45 for efficient combustion. An external fuel (natural gas, fuel oil, propane, etc) may be used to start the process and to maintain a pilot flame into the combustion chamber of the burner 45. A feed pipe 47 relates the burner 45 to the sleeve 24 of the conditioning stage 12. The sleeve 24 may have an exhaust pipe 48 to exhaust some of the combustion gases from the pneumatic circuit 14.

Hence, at the exit of the conditioning stage 12, the biomass is exposed to synthesis gases. The biomass feedstock exiting the conditioning stage 12 has a reduced moisture content, whereby the thermal transformation reaction of the biomass feedstock is initiated when it reaches the air conveyor 40 of the conveyor pneumatic circuit 14, and continues in the torrefaction reactors 30 or like apparatus. There may be some flash evaporation of the moisture in the biomass when it reaches the air conveyor 40 of the conveyor pneumatic circuit 14.

Torrefaction gases emanating from the biomass may be directed to the burner 45, to be part of the combustion. Hence, the torrefaction gases are used to produce heat for both stages 12 and 13. The use of rotary valves 21 and 32 reduce the amount of oxygen entering the system 10.

Still referring to FIG. 1, a condensing unit 15 has water-cooled combustion gas condenser 50 that may be provided as branching off from the pneumatic circuit 14. In FIG. 1, the condenser 50 receives systhesis gases from the return pipe 41, but may be located elsewhere in the pneumatic circuit 14. The condenser 50 is used to condensate humidity in the syngas resulting from the torrefaction process, and may hence be located in proximity of the torrefaction reactors 30. Moreover, the condenser 50 may regulate the temperature of the syngas/combustion gas by its heat capacity.

The combustion gases enter the condenser 50. In an embodiment, the condenser 50 is configured with respect to a feed pipe 51 such that the synthesis gases enter tangentially via an upper portion of the condenser 50. The outlet 52 is equipped with a coil 53 of refrigerant, such as a glycol cooled coil. In an embodiment, outside surfaces of the coil 53 have a double wall jacket with cooling glycol. However, any suitable type or configuration of coil or heat exchanger is considered for the condenser 50. To prevent clogging, the condenser 50 may be equipped with a self-cleaning blow back system with appropriate injection nozzles. The heat recuperated by the coil 53 may be used for heating purposes. In FIG. 1, one or more heating units 54 of the type having a coil and fan is shown, although other arrangements are considered as well. A return pipe 55 may then direct the combustion gases to the pneumatic circuit 14. An appropriate draining circuit may then be used to collect the condensate.

Referring to FIG. 2, the pre-drying stage 16 is shown in greater detail, and may optionally be used to pre-dry biomass feedstock to a suitable moisture content (e.g., 25% to 40%). The pre-drying stage may be comprises of any type of dryers, e.g. rotary dryers, belt dryers or flash dryers. In the illustrated embodiment, the pre-drying stage 16 essentially comprises a dryer 60 defining a chamber in which the biomass feedstock is exposed to hot air, with mixing features operated by motor 60A (e.g., a screw, etc). The dryer 60 has a dryer inlet 61, a recirculating outlet 62 (with rotary valve 62A or equivalent) and a dryer outlet 63 (with rotary valve 63A or equivalent), with both outlets 62 and 63 being in a bottom of the dryer 60. The stage 16 further comprises a pneumatic circuit 64 in association with the dryer 60 to provide hot air, a flow of biomass, and a conveying flow for recirculation of biomass. The dryer 60 and the circuit 64 form a generally hermetic unit, so as to limit air infiltration causing heat loss.

In an embodiment, the pneumatic circuit 64 has an air inlet 64A, followed by a heat exchanger 65 to heat the air from the inlet 64A. The circuit 64 has appropriate piping to direct the heated air from the heat exchanger 65 to the reactor inlet 61. By way of the piping, a biomass source converges with the circuit 64. The biomass source may comprise a hopper, a funnel and a rotary valve 66A or equivalent, to control the amount of biomass entering the circuit 64. The piping of the pneumatic circuit 64 is also fluidly connected to the recirculating outlet 62, with the rotary valve 62A controlling the amount of biomass recirculating via the circuit 64. The piping of the pneumatic circuit 64 then reaches the inlet 61, to discharge a mix of fresh biomass and recirculated biomass, in the flow of hot air. The recirculation of the biomass is performed to expose all biomass to hot air and thus promote uniform temperature condition of the biomass. A portion of the biomass may exit the reactor 60 via the reactor outlet 63, with the rotary valve 63A controlling the amount of biomass exiting the stage 16. A conveyor 67 may then feed the pre-dried biomass to the conditioning stage 12.

In the illustrated embodiment of FIG. 2, the heat exchanger 65 may receive combustion gases from the pneumatic circuit 14 (FIG. 1), for instance combustion gases that are to be exhausted, to recuperate heat therefrom. It is also possible to use any appropriate source of heat, for instance independent of the pneumatic circuit 14, to heat the air in the stage 16. For instance, electric coils may be used.

A filtration unit 68 with blowback may be provided to remove dust and airborne particles from the reactor 60. A water injection unit 69 may be used to extinguish a fire.

Figure 3:
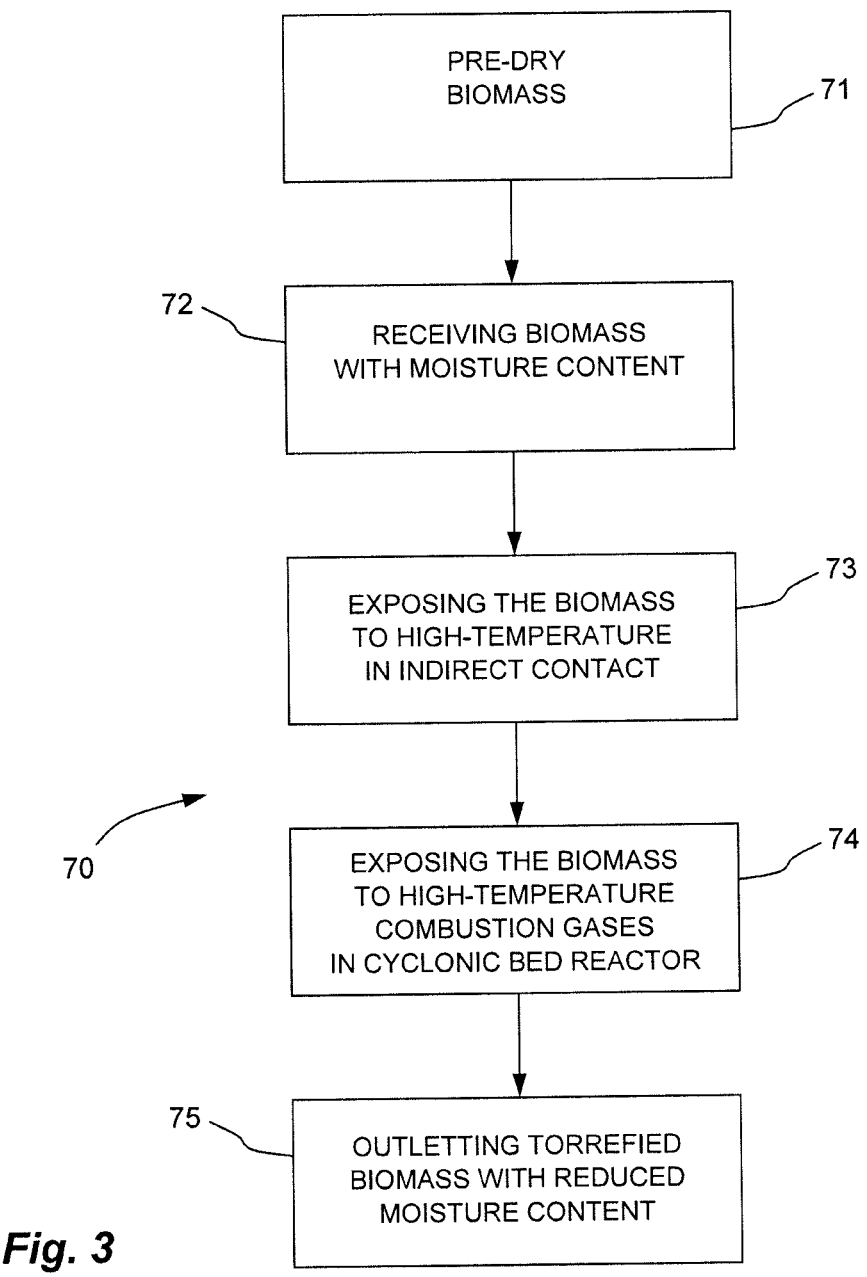
FIG. 3 is a flowchart of a method for the thermo-transformation of biomass products.

Referring to FIG. 3, there is illustrated at 70 a method for thermo-transformation (i.e., torrefaction) of biomass.

According to step 71, the biomass may be pre-dried to reach a suitable temperature or reduce its humidity content, if necessary.

According to step 72, the biomass is received in a sawdust format.

According to step 73, the biomass is exposed to a high temperature by indirect contact (e.g., temperature above the temperature of condensation of tar), whereby the biomass feedstock is heated and its moisture content may be reduced. In an embodiment, the biomass that is exposed to these conditions is a continuous feed of biomass.

According to step 74, the biomass is directly exposed to a high-temperature combustion gas flow (a.k.a., flue gases) and residual torrefaction gases, with low static pressure, subsequent to step 52. As a result, the biomass feedstock undergoes thermo-transformation, by which the chemical structures of the biomass may be broken (i.e., lignin, cellulose, hemi-cellulose). Volatile organic compounds may be vaporized after the two stages, thereby improving the condition of the biomass for combustion. Moisture may further evaporate from the biomass. For example, flash evaporation of moisture in the biomass may occur.

According to step 75, the biomass is outlet with a reduced moisture content. The biomass may be subjected to a cooling stage. It is pointed out that the biomass may be exposed to an inert environment (i.e., negligible level of oxygen) in steps 74 and/or 75.

The resulting torrefied biomass may be in any appropriate format. For instance, the torrefied biomass is in a sawdust state, although it could be in flakes, granules, pellets or the like. The torrefied biomass may be used in any appropriate application. For example, the torrefied biomass may be used as a fuel in combustion. Applications include non-exclusively co-firing in large coal power plants, heavy fuel oil substitution, partial substitute for coke in carbon anodes, blast furnaces, iron ore pellets, activated carbon for gas purification, gold purification, metal extraction and many other applications, soil amendment and soil remediation (mining site rehabilitation), among numerous possibilities.

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A method for the torrefaction of biomass comprising:
receiving biomass having a given moisture content;
heating the biomass in a generally inert environment by indirect contact, the generally inert environment being defined by a level of oxygen being below a level enabling combustion;
subsequently torrefying the biomass by exposing the biomass to a flow of combustion gases directly from an exhaust of a burner, a combustion being controlled to adjust the level of oxygen at the exhaust of the burner below the level enabling combustion to maintain the generally inert environment; and
outletting the biomass with a reduced moisture content.

2. The method according to claim 1, wherein heating the biomass by indirect contact comprises circulating the biomass in a conduit surrounded by a heated sleeve.

3. The method according to claim 2, wherein heating the biomass comprises directing a portion of the combustion gases in the heated sleeve.

4. The method according to claim 2, wherein circulating the biomass in the conduit comprises conveying the biomass with a feed screw.

5. The method according to claim 2, wherein heating the biomass in a generally inert environment comprises inletting the biomass in the conduit by operating a rotary valve.

6. The method according to claim 1, wherein heating the biomass comprises heating the biomass to a temperature ranging from to 250 C to 400 C.

7. The method according to claim 1, wherein exposing the biomass to a flow of combustion gases comprises circulating the biomass in a cyclonic flow.

8. The method according to claim 7, wherein circulating the biomass in a cyclonic flow comprises exposing the biomass to an annular vortex of the combustion gases in the cyclonic flow to increase a resident time of the biomass in the cyclonic flow.

9. The method according to claim 1, wherein torrefying the biomass comprises exposing the biomass to a temperature ranging from 300 C to 500 C by exposing the biomass to the combustion gases.

10. The method according to claim 1, further comprising cooling the biomass after the outletting by conveying the biomass in a feedscrew unit.

11. The method according to claim 1, wherein outletting the biomass comprises operating a rotary valve to control an amount of outlet biomass.

12. The method according to claim 1, further comprising drying the biomass prior to heating the biomass by indirect contact.

13. The method according to claim 12, wherein drying the biomass comprises at least one of mixing and recirculating biomass within a chamber of a reactor while exposing the biomass to hot air.

14. The method according to claim 12, wherein drying the biomass comprises drying the biomass to a moisture content ranging from 20% to 40%.

15. The method according to claim 12, wherein drying the biomass comprises heating air by heat exchange with combustion gases used for at least one of heating the biomass by indirect contact and torrefying the biomass.

16. The method according to claim 1, further comprising controlling a temperature of the combustion gases used for of heating the biomass by indirect contact and torrefying the biomass, by operating a heat exchanger with refrigerant in a pneumatic circuit in which the combustion gases circulate.

17. The method according to claim 16, further comprising collecting a condensate from the heat exchanger to remove moisture from the combustion gases.

18. The method according to claim 16, wherein operating the heat exchanger comprises operating the heat exchanger adjacent to an outlet of the torrefying of the biomass.

19. The method according to claim 1 further comprising collecting torrefaction gases from the step of exposing the biomass to a flow of combustion gases, and wherein exposing the biomass to a flow of combustion gases comprises exposing the biomass to a flow of combustion gases and of torrefaction gases.

20. A method for the torrefaction of biomass comprising:
receiving biomass having a given moisture content;
heating the biomass in a generally inert environment by indirect contact, the generally inert environment being defined by a level of oxygen being below a level enabling combustion;
subsequently torrefying the biomass by directly exposing the biomass to a flow of combustion gases received from at least one pipe extending from an exhaust of a burner, a combustion being controlled to adjust the level of oxygen at the exhaust of the burner below the level enabling combustion to maintain the generally inert environment; and
outletting the biomass with a reduced moisture content.

* * * * *